N. LUDWIG.
BEER CARBONATING DEVICE.
APPLICATION FILED SEPT. 13, 1909.
972,883.
Patented Oct. 18, 1910.
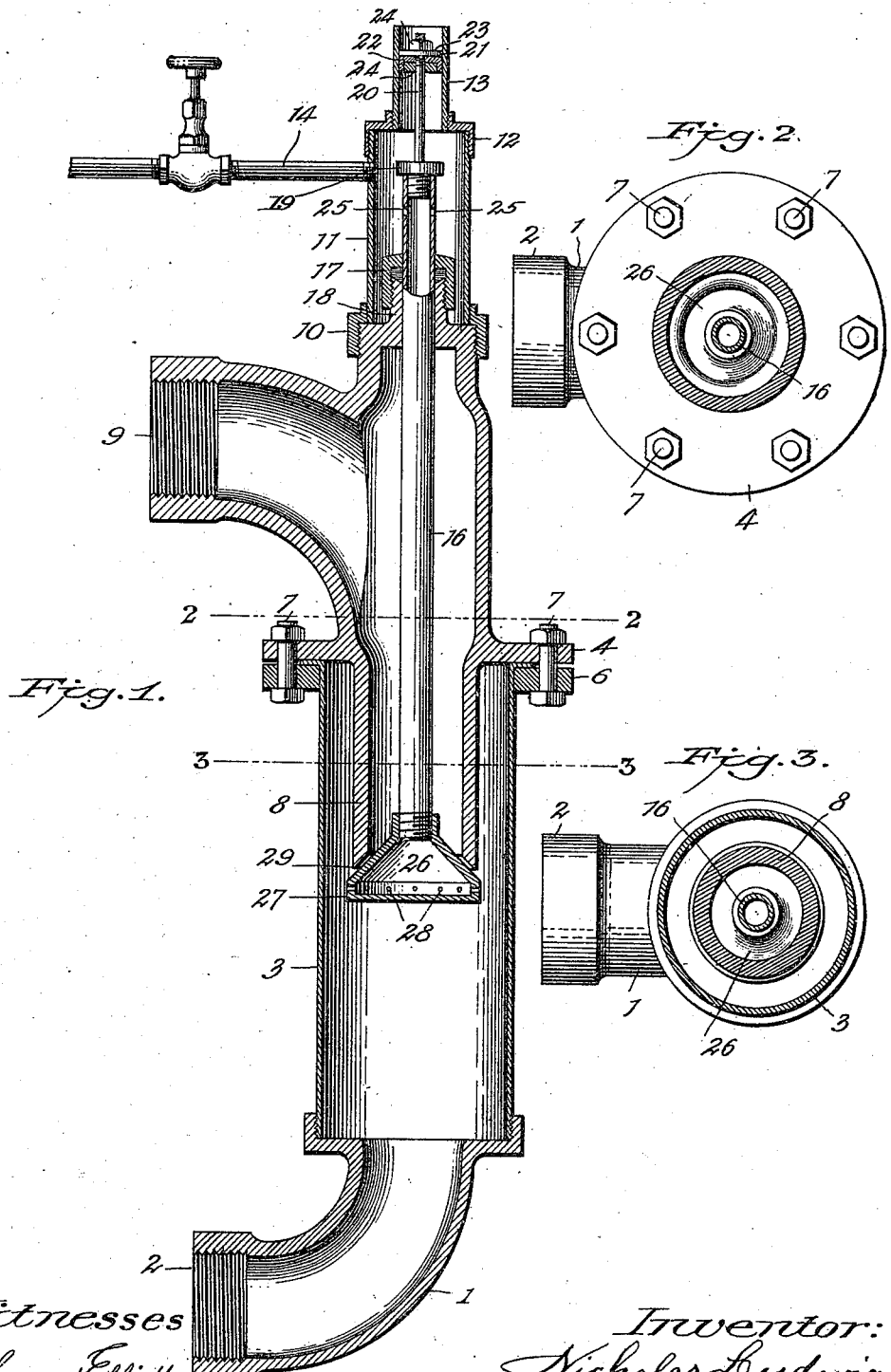

UNITED STATES PATENT OFFICE.

NICHOLAS LUDWIG, OF DENVER, COLORADO.

BEER-CARBONATING DEVICE.

972,883.  Specification of Letters Patent.  Patented Oct. 18, 1910.

Application filed September 13, 1909. Serial No. 517,404.

*To all whom it may concern:*

Be it known that I, NICHOLAS LUDWIG, a citizen of the United States of America, residing in the city and county of Denver and State of Colorado, have invented a new and useful Beer-Carbonating Device, of which the following is a specification.

My invention relates to a carbonating device for beer, and the objects of my invention are: first, to provide an automatically operating valve controlled carbonator for charging beer with carbonated gas; second, to provide a beer carbonator in which the gas pressure automatically controls the flow and charging of beer; and third, to provide a simple, durable, easily applied, and thoroughly practical beer carbonating device. I attain these objects by the mechanism illustrated in the accompanying drawings, in which:

Figure 1, is a vertical, longitudinal sectional view of the improved device. Fig. 2, is a horizontal, sectional view thereof on the line 2—2 of Fig. 1. And Fig. 3, is a similar view on the line 3—3 of Fig. 1.

Similar numerals of reference refer to similar parts throughout the several views.

Referring to the drawings, the numeral 1 designates an elbow, one end 2, of which is adapted to be connected to a beer filtering device, which I do not illustrate. The opposite end of this elbow 1 is threaded to one end of a tube 3 which is made of copper or other suitable material, and forms the beer and carbonic acid gas mixing chamber, or cylinder of my beer carbonator. The opposite end of this tube 3 is secured to a flange 4 which forms a part of the beer inlet tube of the carbonator cylinder. This tube may be secured to the flange in any suitable manner, but I preferably secure it so that its elbow may be turned around to point in any desired direction, and to accomplish this purpose I provide its end portion with a right angled flanged terminal end portion, which is arranged to be clamped against the bottom of the flange 4 by a washer 6 which fits over the tube and bears against the under side of the flange portion of the tube and is bolted by bolts 7 to the flange to form a liquid tight joint.

The beer inlet tube is provided with a tubular outlet end 8 that depends below its flange portion 4, into the mixing chamber. This beer inlet tube comprises a tube that is provided with a side inlet nipple portion 9, which is adapted to be threaded or otherwise connected to a beer pump, which I do not illustrate, but which is connected to a supply of beer and is adapted to draw the beer to it and to force it into and through the beer inlet tube and mixing chamber of the carbonator. The upper end of the beer inlet tube extends far enough above the side inlet to receive a cap 10, which is removably threaded to it, and which is provided with an axial aperture, to which a tube 11 is threaded at one end. The opposite end of the tube 11, is provided with a cap 12, which is threaded and brazed to it. This tube 11 I term the gas chamber. The cap 12 is provided with an axial aperture, to which a short open ended tube 13 is secured. This tube I term the piston tube. The cap 12 is also provided with a side nipple 14 to which a gas inlet valve 15 is attached, and which is adapted to be connected to a supply of carbonic acid gas. The piston tube 13, the gas chamber tube 11, and the cap receiving end of the beer inlet tube are all arranged in alinement with the depending outlet tubular portion 8, and a hollow tubular stem 16 extends axially through them. This valve stem 16 comprises a tube which extends slidably through a gland 17, and a stuffing box hub portion 18, that is formed on the cap receiving end of the beer inlet tube. A packing chamber is formed between the stuffing box hub portion and the gland 18, that is provided with a suitable packing. The upper end of this valve stem tube terminates in the upper end portion of the gas chamber tube, and its terminal end is provided with a disk 19, that acts as a stop to its sliding movement through the packing box end of the beer inlet tube. A threaded stem 20 is secured to the center of this disk, and extends into the piston tube 13, and on its end a piston 21 is secured, that fits slidably in the tube. This piston 21 consists preferably of a cupped leather washer 22, supported by a washer 23, which is mounted on the stem and is clamped by nuts 24, against the cupped washer 22, and support it on the stem. This piston is adjustable along the length of the stem relative to the position of the cap of the hollow valve stem. The hollow valve stem is arranged so that the gas can pass into it from the gas chamber tube 11, and I preferably provide it with one or more apertures 25, two being shown, which are positioned in it just far enough below its end cap disk to pass wholly into the stuffing box of the beer inlet tube, thus closing them when the valve stem is moved to bring its cap against the gland of the stuffing box; and the stem 20, is made of sufficient length, and also the piston tube 13, to permit the gas actuated piston 21, to move within its tube 13, the length of the operative movement of the hollow valve stem, to open and close the gas inlet apertures 25, and still remain within its piston tube 13.

The hollow valve stem 16 extends through the beer inlet tube to adjacent to its lower end, where it is connected to a valve 26. This valve 26 is preferably of an inverted conical form throughout the greater portion of its length, that terminates at its largest end in a short straight circular end portion 27, through which into the space within the valve a plurality of small perforations 28 are formed that are arranged in a circumferential row around the peripheral surface of its straight circular end portion 27. The conical body portion of this valve 26, is adapted to register with a similarly tapering seat portion 29 formed in the lower terminal end of the beer inlet tube. The valve 26 is not intended to seat tightly against its seat 29, as it is normally held by the opposing pressures of the beer and gas at a small but varying distance from it, which is sufficient to allow beer to always flow from the beer inlet tube through it into the mixing chamber. The area of the valve and the discharge valve seat of the beer inlet tube relative to the area of the piston 21, is such that the pressure of the gas against the piston 21, in the gas chamber, is sufficient to hold the valve slightly open against the flowing pressure of the beer into the beer inlet tube from the pump that feeds the supply of beer to the carbonator, and is sufficient to effect what is termed in the art a backing of the beer in the beer inlet tube, while at the same time the opening is sufficient to allow a circumferential tubular ring of beer to flow through the valve and over the conical surface of the valve to receive and be properly charged with the carbonic acid gas as it flows continuously past the circular row of perforations in the valve from which the gas flows into the beer in needle-like jets. It is essential that the area of the piston 21 and valve 26, be proportioned to accomplish this, because if the beer flows in too great a volume through the valve into and through the mixing chamber, it will not be properly charged with the gas.

The operation of my improved carbonator is as follows: The beer flows continuously into the beer inlet tube under pressure, and if the gas is not needed, the gas inlet valve 15 is closed. The pressure of the beer then moves the valve 26 down into the mixing chamber, and its hollow stem would be moved down also until its cap 19 rests on the gland 17 which prevents the farther movement of the valve 26 away from its seat. This movement of the valve 26 away from the seat 29 of the beer inlet tube, closes the gas inlets 25 in the hollow valve stem, and prevents the beer from backing up through the apertures 28 in the valve 26, and its stem 16, and through the gas inlets 25 in the hollow valve stem, which it would do when the gas is shut off if these inlet apertures 25 were not closed, as they are moved into the gland and stuffing box portion of the beer inlet tube; consequently no beer can enter the gas chamber 11 and interfere with the action of the gas when the beer is shut off from the chamber 11. When, however, the beer assumes a flat appearance, it requires to be again charged with gas. The inlet valve is then opened, and the gas pressure which is controlled by a pressure regulator that is not illustrated, in connection with the gas inlet pipe 14 and valve 15, flows into the chamber 11 and accumulates in the gas chamber tube against the piston 21 until it is strong enough to move this piston away from the chamber in its tube 13, to draw the disk 19 and the gas inlet apertures 25 of the stem up into the gas chamber from the packing gland, and to move the valve 26 against the pressure of the beer flowing through the beer inlet tube and its discharge outlet, to a position in which the volume of the beer is reduced to a quantity that will be properly charged with the gas as it discharges into it; and this position of the valve 26 relative to its seat is where the pressure of the gas counterbalances the pressure of the beer, and still allows an opening through or past the valve sufficiently large to allow the volume of beer to flow through the gas flowing into it. The gas and beer then flow into the mixing chamber, and the gas penetrates the beer and properly charges it with the carbonic acid gas, and the beer flows from the mixing chamber through its discharging elbow. Then after the beer has been properly charged, the inlet valve 15 is closed and the pressure of the beer moves the valve and its stem to move the gas inlet ports into the packing gland, thus closing the valve stem and valve 26 to the entrance of the gas and its discharge into the beer.

The inlet valve 15 may be left open at all times, if it is desired to continuously charge beer, and the valve 26 is automatically moved down by the beer to close the gas inlet apertures in the stem whenever the pressure of the beer becomes enough greater than the pressure of the gas to move the valve away from its seat; then the gas pressure becomes enough greater than the beer pressure, and the valve 26 moves close enough to its seat to pack the beer in its inlet tube, increasing its pressure, which will move the valve away from its seat. The valve 26 and piston 21 will thus work automatically to open and close the valve 26 to the gas, if the pressures of the gas and beer fluctuate, and it is desirable that they be so proportioned and that the area of the valve 26 and piston 21 be such relative to each other that the valve 26 will maintain an opening that will allow a flow of beer through it that will be properly charged by the gas.

My invention is simple and durable and makes a positively operating, automatically regulated, beer carbonator.

Having described my invention, what I claim as new and desire to secure by Letters Patent, is:—

1. A carbonator for beer, comprising a gas and beer mixing cylinder provided with a discharging outlet, a valve controlled beer inlet to said cylinder, a gas cylinder arranged to be connected to a supply of beer charging gas under pressure, a hollow stem on said beer inlet valve extending into said gas cylinder, a tube above said gas cylinder, a rod connected to the upper end of said hollow stem and extending into said tube, a piston on the end of said rod and slidably mounted in said tube, said piston being arranged to be operated by gas flowing into said gas chamber to control the flow of beer into said mixing cylinder, said hollow stem being provided with apertures leading into it from said gas cylinder and said beer inlet valve being also provided with apertures that communicate with the said stem and its gas inlet apertures.

2. In a carbonating device for beer, the combination of a beer and gas receiving and mixing cylinder, provided with a discharging aperture arranged to be turned and set to point in any desired direction from said cylinder, a beer inlet tube connected to said mixing cylinder provided with a valve seat, a hollow valve arranged to fit said seat and provided with gas discharging apertures, a hollow stem portion on said valve extending through said beer inlet tube, a gas cylinder on said beer inlet tube surrounding the end of said hollow valve stem, a packing box surrounding said valve stem within said gas cylinder in which said stem is slidably supported, a cap on the end of said stem, adapted to engage said packing box and limit the sliding movement of said beer inlet valve away from its seat, said hollow stem being provided with a gas passage from said gas cylinder adjacent to said cap, a gas pressure actuated piston seated in said gas cylinder and adjustably connected to said hollow stem, said gas actuated piston being proportioned in area to said beer inlet valve to automatically open or close said beer and gas mixing valve and said gas inlet passage in said gas cylinder by the pressure of said gas in said cylinder.

3. In a carbonating device for beer, the combination of the beer and gas mixing cylinder, provided with a discharge outlet and a beer inlet, a tube provided with a valve seat and with a packing box in alinement with its valve seat, and with a beer inlet aperture adapted to be connected to a supply of beer under pressure, and the gas inlet cylinder provided with a tube and piston and arranged to be connected to a supply of carbonic acid gas under pressure, with a hollow valve stem extending slidably through said beer inlet tube's packing box into said gas cylinder at one end and extending to and provided with a hollow conical shaped valve at its opposite end arranged in said beer and gas mixing cylinder to control the beer inlet valve, a cap portion on said hollow stem within said gas cylinder arranged to define the beer valve's movement away from its seat, said hollow stem being provided with gas inlet apertures close to its cap portion arranged to be opened and closed by the sliding movement of said hollow stem in said gas cylinder and said packing box, said beer inlet valve being provided with a circumferential row of gas discharging apertures in its end arranged to discharge a suitable beer charging gas into said mixing chamber below said beer inlet tube's valve seat, and a piston adjustably secured to said hollow stem and arranged to fit slidably within said tube of said gas cylinder arranged and adapted to control the beer inlet valve by the gas pressure in said gas cylinder.

4. In a device as specified, a main tubular member having a beer inlet on one side thereof and a valve seat in its lower end; a gas chamber on the upper end of said tubular member; a piston tube forming a continuation of the gas chamber and in axial line therewith; a hollow stem extending through the tubular member and into the gas chamber, having gas inlet apertures adjacent to its upper end; a hollow valve on the lower end of the stem adapted to have a varying position relatively to the valve seat at the lower end of the tubular member, and having gas outlet apertures; a rod on the upper end of the valve stem which extends into the piston tube; a piston in said chamber upon said rod; a valved pipe connecting the gas chamber with a supply of suitable gas; and a packing box on the upper end of the tubular member adapted to close the gas inlet apertures in the upper end of the valve stem when said stem is at the limit of its downward movement.

5. In a device as specified, a main tube having a lateral beer inlet and a valve seat outlet at its lower end; a gas chamber on the upper end of the main tube, and a piston tube forming a continuation of the gas chamber and in axial line therewith; a hollow stem extending through the main tube, having gas inlet apertures adjacent to its upper end; a valve on the lower end of said stem adapted to stand at varying positions relatively to the seat in the main tube; a piston in the piston tube connected with the valve stem; means for admitting gas to the gas chamber; means for closing the gas inlets in the valve stem when the same is at the limit of its downward movement; and means for limiting the said downward movement.

6. In a device as specified, a main tube having a side inlet; a gas chamber upon the upper end of the main tube; a hollow valve in operative relation to the lower end of the tube; a hollow stem extending from said valve into the gas chamber, having inlets connecting said valve and chamber; means for closing said inlets when the valve is farthest away from the end of the main tube; a valved inlet tube connecting the gas chamber with a suitable gas supply; and means connected with the hollow tube whereby the same is raised under pressure of gas in said chamber, causing the valve to diminish the area of the outlet at the bottom of the main tube.

In testimony whereof I affix my signature in presence of two witnesses.

NICHOLAS LUDWIG.

Witnesses:
G. SARGENT ELLIOTT,
ADELLA M. FOWLE.